United States Patent Office 3,291,583
Patented Dec. 13, 1966

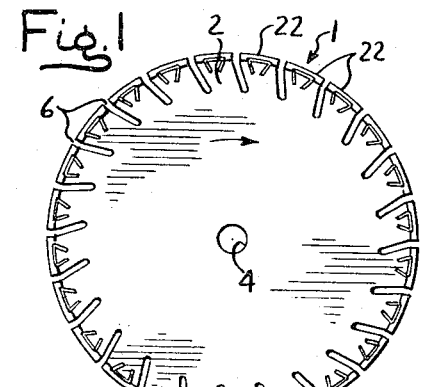
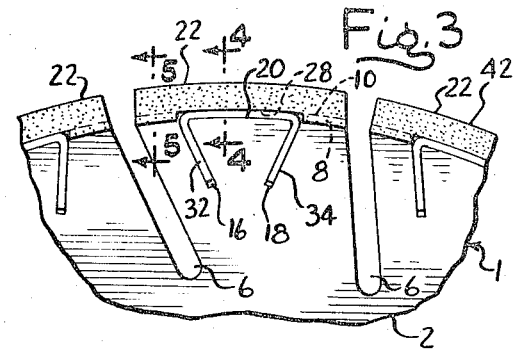
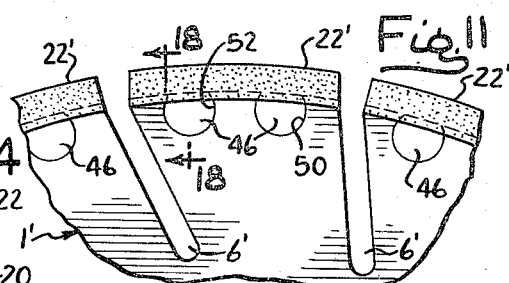
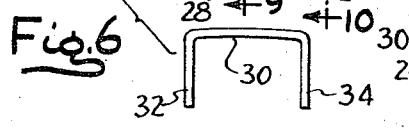
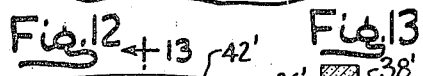
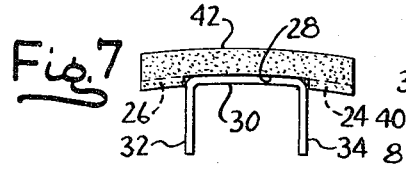
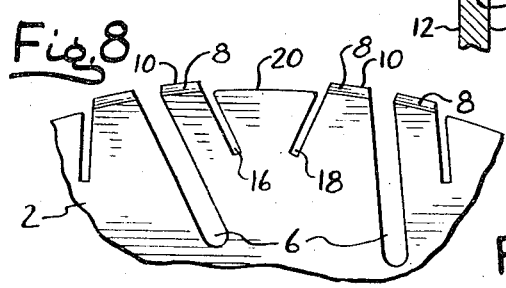
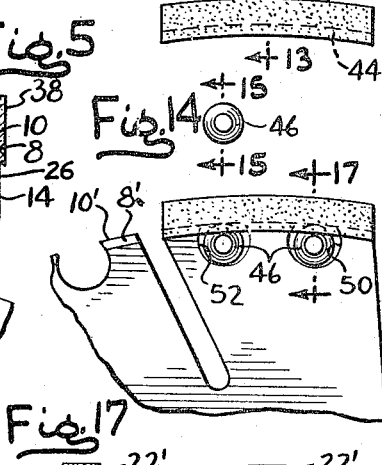
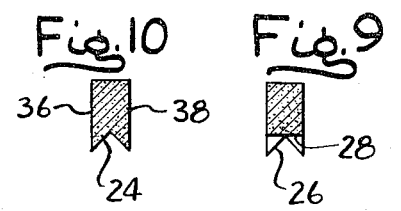
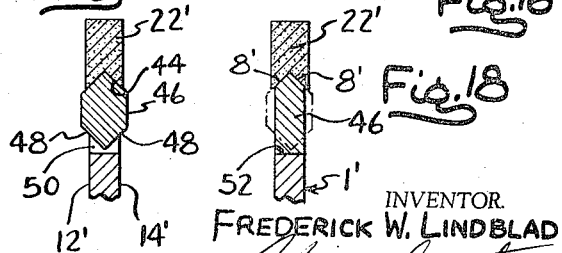
INVENTOR.
FREDERICK W. LINDBLAD
BY Morris Spector
ATTYS.

3,291,583
METHOD OF MAKING A SAW
Frederick W. Lindblad, 835 Illinois Ave., Aurora, Ill.
Original application Feb. 19, 1963, Ser. No. 259,551, now Patent No. 3,221,728, dated Dec. 7, 1965. Divided and this application Sept. 2, 1965, Ser. No. 484,623
6 Claims. (Cl. 51—293)

This invention relates to a method of making saws of the kind used for sawing hard material such as concrete, granite, or the like, and the present application is a division of my application Serial No. 259,551, filed February 19, 1963, now Patent 3,221,728, which is a continuation-in-part of my co-pending application Serial No. 106,789, filed May 1, 1961, now Patent 3,146,561.

Saws of the kind with which this invention is primarily concerned generally have a hardened and tensioned disc, generally of steel, to which are soldered or brazed preformed segments of abrasive material, as for instance abrasive particles embedded in a suitable matrix of metal. The disc is usually heat treated to give it strength in tension, enabling it to operate effectively at high speeds. However, one of the difficulties in securing the abrasive segments onto the steel disc by brazing or soldering, lies in the fact that the heat of soldering or brazing tends to destroy the heat treatment of the disc and to set up objectionable stresses, both of which reduce the strength and life of the saw.

It is an object of the present invention to provide a method of making the above type of saw in which the abrasive segments are securely fixed to the periphery of the disc in a novel manner so as to reduce as much as possible forces tending to move the segments relative to the disc.

It is also an object of the present invention to provide a method of making a saw of the above type stated in which the segments are bonded to the periphery of the disc at mutually engaging counterpart surfaces.

It is a further object of the present invention to provide a method of making a saw of the type stated in which, in addition to the adhesive bond between the counterpart surfaces of the segment and the disc, locking elements are secured to the segments and disc at recesses in the disc at the periphery thereof to assist in preventing radial retraction from or peripheral movement of the segments on the disc. In one form of the invention, the locking elements are formed by a U-shaped wire that is secured to each segment and is forced into the disc recesses to clinch the segments to the disc; in another form of the invention the locking elements are beadlike rivets that are inserted into the disc recesses and are mechanically staked or peened over to secure them rigidly in the recesses. Adhesive may also be used to assist in the securing of the locking elements in the recesses.

It is an additional object of the present invention to provide a saw of the type stated in which the abrasive segments can be assembled with the disc by cold bonding or without the application of appreciable heat, less than the annealing temperature of the hardened and tensioned steel disc, thereby eliminating the danger of heat distortion or destroying the effectiveness of the heat treatment of the disc. Cold bonding of the segments to the disc or bonding by application of only a small amount of heat permits the use of discs wherein it is not possible to heat solder or braze the segments thereto as, for instance, a disc made of plastic, rubber, fiber, or other suitable nonmetallic material.

The attainment of the above and further objects of the present invention will be apparent from the following specification taken in conjunction with the accompanying drawing forming a part thereof.

In the drawing:
FIG. 1 is a side elevational view of a circular saw constructed in accordance with and embodying the present invention;
FIG. 2 is a top plan view thereof;
FIG. 3 is a fragmentary side elevational view, on an enlarged scale, of a portion of the saw of FIG. 1;
FIGS. 4 and 5 are fragmentary sectional views taken along lines 4—4 and 5—5, respectively, of FIG. 3;
FIG. 6 is an exploded side elevational view of one of the abrasive segments and its associated locking wire, shown prior to securing the locking wire and the segment together;
FIG. 7 is a side elevational view, similar to FIG. 6, and showing the locking wire secured to the abrasive segment;
FIG. 8 is a fragmentary side elevational view, on an enlarged scale, of the disc prior to assembly of the structure of FIG. 7 therewith;
FIGS. 9 and 10 are sectional views taken along lines 9—9 and 10—10 of FIG. 6;
FIG. 11 is a fragmentary side elevational view, similar to FIG. 3, and showing a modified form of saw constructed in accordance with and embodying the present invention;
FIG. 12 is a side elevational view of one of the abrasive segments used in the saw of FIG. 11;
FIG. 13 is a sectional view taken along line 13—13 of FIG. 12;
FIG. 14 is a side elevational view of one of the rivets used in securing the segment of FIG. 12 to the disc of FIG. 11;
FIG. 15 is a sectional view taken along line 15—15 of FIG. 14;
FIG. 16 is a fragmentary side elevational view, similar to FIG. 11, and showing a step in the method of assembling the segment of FIG. 12 and rivets of FIG. 14 with the disc;
FIG. 17 is a fragmentary sectional view taken along lines 17—17 of FIG. 16; and
FIG. 18 is a fragmentary sectional view taken along line 18—18 of FIG. 11.

As best seen in FIGURES 1, 3 and 8 saw 1 comprises a disc 2 which may be a hardened and tensioned steel member as is conventional in the art, said disc 2 including a central opening 4 or other conventional means for mounting the disc on an arbor of a motor-driven saw. At its outer periphery the disc 2 has a series of slots 6 for cooling and swarf clearance. In this instance there are twenty-four such slots uniformly spaced around the perimeter of the disc 2. The disc 2 may also be made of plastic, rubber, fiber, or other suitable material.

At its outer periphery the disc 2 is tapered as indicated in FIGURES 3, 5 and 8 at 8, 8 to a point 10 which forms an annular ridge centered between the side faces 12 and 14 of the disc 2.

Intermediate the slots 6, the disc 2 is formed with pairs of recesses 16, 18 (FIGURES 3 and 8) that extend from the periphery of the disc 2 inwardly and toward one another. The recesses 16, 18 also occupy the full width of the disc 2. Between each pair of recesses 16, 18 the tapered portion 8, 8 is cut away to provide a cylindrical surface 20.

Twenty-four identical cutting segments 22, each preferably greater in width than the width of the perimetral part of the disc 2, are assembled around the edge of the disc 2. Each of the segments 22 is preferably a diamond cutting segment of compositions known in the art and includes diamond abrasive particles embedded in a suitable metal. As best seen in FIGURES 6, 7, 9 and 10, the bottom surface of each segment 22 has longitudinally spaced V-shaped grooves 24, 26 therein which are each of a shape that is the counterpart of the surfaces 8—8 at the periphery of the disc 2. Intermediate the grooved portions 24, 26, each segment has a notch 28 to which is bonded, as by brazing or other conventional manner, a U-shaped wire 30 that may be of square cross section, as shown, or may be of oblong cross section. The bight of the wire 30 is of a length approximately the same as that of the notch 28, and the tines 32, 34 of the wire project radially inwardly from the segment and are spaced apart a distance approximately equal to the distance between the peripheral mouths of the recesses 16, 18, as appears by reference to FIGS. 7 and 8.

After each segment 22 and is associated wire 30 are assembled together (FIG. 7), that assembly is placed over the periphery of the disc 2 so that the tines 32, 34 of the wire 30 fit into the peripheral mouths of the recesses 16, 18. As the segment 22 is mechanically forced radially inwardly, the tines 32, 34 extend further into the recesses 16, 18 causing them to clinch the disc 2. The segment 22 is pushed radially inwardly until the grooved portions 24, 26 seat on the counterpart surfaces 8, 8, as shown in FIGURES 3-5. The counterpart surfaces 24, 8—8 and 26, 8—8 are secured together by an interposed bonding film of a suitable adhesive, for example, an epoxy resin adhesive. This adhesive may, if desired, be applied to adhere the tines 32, 34 in place within the recesses 16, 18.

The foregoing construction locks the segments 22 to-disc 2 against lateral motion and the clinching action of the wire tines 32, 34 locks the segments 22 against radial retraction or circumferential movement on the disc 2.

The V-shaped grooves 24, 26 at the bottom of the segments 22 are centered between the segment side faces 36 and 38 which are in planes parallel to the planes of the opposite sides 12, 14 of the disc 2. This insures that the segments 22 are centered on the disc 2 during assembly therewith. During use, as the segments 22 wear, they tend to wear down to shapes such as is indicated at dotted line 40 (FIG. 5) which is a shape approximating the surfaces 8, 8.

It is to be noted that the surfaces 8, 8 provide a large area of contact between the periphery of the disc 2 and the segments 22. This area may be substantially increased by making the surfaces 8, 8 at a more acute angle to one another. Moreover, each of the segments 22 is arcuate at its outer edge 42 along a circle whose center is the center of the disc 2.

When the segments 22 are secured to the disc 2 by a film of epoxy resin, it is not necessary to apply appreciable heat to the disc 2 or to the segments 22 as part of the step of securing them together. This eliminates the risk of heat distortion, undesirable stresses, or the like during assembly of the saw. Moreover, a disc 2 of fiber, rubber, plastic, etc., may be used since soldering or brazing and the heat thereof are eliminated in the assembly of the disc and segments.

A modified form of saw 1' is shown in FIGS. 11–18 in which like reference numerals with a prime added indicate parts corresponding to the parts of the saw 1 of FIGS. 1–10. In the saw 1' each segment 22' has a V-shaped groove 44 at its inner periphery and in that groove there is brazed or otherwise secured two spaced apart bead-like rivets 46, 46. Each of the rivets 46 have tapered surfaces 48, 48 that mate with the surfaces forming the V-groove 44 to insure a large area of bonded contact of the rivets 46 with the segments 22'. Moreover, each rivet 46 is somewhat wider than the disc 2', and at least as great as the thickness of the segment 22', as seen in FIG. 17, and for purposes presently more fully appearing.

The disc 2' has pairs of recesses 50, 52 between the swarf clearance slots 6'. These recesses 50, 52 are of generally circular shape and, as best seen in FIGURE 16, each has a width, at the periphery of the disc 2', that is slightly greater than the diameter of the rivets 46, 46.

Moreover, the centers of the recesses 50, 52 preferably lie below the periphery of the disc 2' an amount less than the radius of each rivet, and each recess 50, 52 has a maximum diameter that is greater than the diameter of each rivet 46.

The segments 22' with the rivets 46 assembled therewith are placed over the periphery of the disc 2' so that the surfaces forming the V-groove 44 seat upon the counterpart surfaces 8', 8' of the disc 2' and the rivets 46, 46, enter the recesses 50, 52, as shown in FIGS. 16 and 17. The counterpart surfaces are bonded together by an epoxy resin or other suitable adhesive.

Each rivet 46 is then mechanically staked or peened to increase its diameter from the dotted to full line positions, as shown in FIG. 18, to fill or approximately fill the recesses 50, 52. The thickness of the rivets 46 will be reduced to that approximately that of the width of the disc 2'.

The counterpart V-surfaces of the segments 22' and disc 2' center the segments on the disc and also prevent relative axial movement of the segments 22' and disc 2'. The adhesive also assists in preventing circumferential movement of the segments 22'. The rivets 46 prevent radial retraction of the segments 22' and also circumferential movement of the segments 22'.

Like the saw of FIGS. 1–10, the saw of FIGS. 11–18 does not require appreciable heating and hence does not impair a hardened and tensioned steel disc. Also, the construction and method of FIGS. 11–18 may be in connection with fiber, rubber, plastic and other non-metallic discs.

In compliance with the requirements of the patent statutes, there have been shown preferred embodiments of the present invention. What is considered new and sought to be secured by Letters Patent is:

1. A method of making a saw, which method comprises providing a circular disc, the peripheral portion of which is narrower than the radially inward adjacent part of the disc and which has recesses extending inwardly from said peripheral portion, providing a plurality of hardened arcuate cutting segments that include diamond abrasive particles embedded in a matrix and each having at least one radially inwardly opening groove that is a counterpart of peripheral surface means of the disc, securing to the arcuate segments retaining elements that project radially inwardly therefrom, placing the segments around the disc with the peripheral surface means of the disc entering the grooved portions of the segments and with the elements entering the recesses, causing said elements to deform beyond elastic limits in said recesses and cooperate with the recesses to secure the segments against peripheral and circumferential movement on the disc, and adhering the segments to the disc by an interposed bonding film.

2. A method according to claim 1 wherein the elements are deformed as they enter the recesses.

3. A method according to claim 1 wherein the elements are deformed after they enter the recesses and after the segments are seated on the disc.

4. A method according to claim 1 wherein the disc is a hardened and tensioned metallic member and the adherence by the bonding film takes place substantially below the annealing temperature of the disc.

5. In the fabrication of a saw which comprises a circular disc that has recesses extending inwardly from its periphery and has hardened arcuate cutting segments, each segment of which has at least one radially inwardly presenting surface that is a counterpart of a peripheral surface portion of the disc and wherein the segments include abrasive particles embedded in a matrix, a method which comprises securing to radially inwardly presented parts of the segments retaining elements that project radially inwardly therefrom, placing the segments around the disc with the peripheral surface means of the disc engaging the counterpart portions of the segments and with the elements entering the recesses and with the segments being centered between opposite sides of the disc, causing said elements to deform beyond elastic limits in said recesses and cooperate with the recesses to secure the segments against peripheral and circumferential movement on the disc, and adhering the segments to the disc by an interposed bonding film.

6. A method according to claim 5 in which the adherence by the bonding film takes place below a temperature that would impair the desired characteristics of the disc portion of the saw.

References Cited by the Examiner

UNITED STATES PATENTS

| | | | |
|---|---|---|---|
| 3,072,470 | 1/1963 | Hinshaw | 51—206.4 |
| 3,110,579 | 11/1963 | Benson et al. | 51—293 |
| 3,203,774 | 8/1965 | Pratt | 51—293 |

ALEXANDER H. BRODMERKEL, *Primary Examiner.*

D. J. ARNOLD, *Assistant Examiner.*